US010074494B2

(12) United States Patent
Parapurath et al.

(10) Patent No.: US 10,074,494 B2
(45) Date of Patent: Sep. 11, 2018

(54) METHOD FOR POINT ON WAVE SWITCHING AND A CONTROLLER THEREFOR

(71) Applicant: ABB TECHNOLOGY LTD, Zürich (CH)

(72) Inventors: Anoop Parapurath, Kerala (IN); Anil Talluri, Bangalore (IN)

(73) Assignee: ABB Schweiz AG, Baden (CH)

( * ) Notice: Subject to any disclaimer, the term of this patent is extended or adjusted under 35 U.S.C. 154(b) by 712 days.

(21) Appl. No.: 14/581,198

(22) Filed: Dec. 23, 2014

(65) Prior Publication Data

US 2015/0179365 A1 Jun. 25, 2015

(30) Foreign Application Priority Data

Dec. 23, 2013 (IN) .......................... 6040/CHE/2013

(51) Int. Cl.
*H02H 3/027* (2006.01)
*H01H 9/56* (2006.01)
*H01H 71/12* (2006.01)

(52) U.S. Cl.
CPC ............ *H01H 9/56* (2013.01); *H01H 71/123* (2013.01)

(58) Field of Classification Search
USPC ........................................................ 361/62
See application file for complete search history.

(56) References Cited

U.S. PATENT DOCUMENTS 5,132,867 A 7/1992 Klancher
6,433,980 B1 * 8/2002 Tsutada .................... H01H 9/56 361/83
8,983,820 B2 * 3/2015 Parapurath .............. H04L 43/50 703/13
2003/0095367 A1 * 5/2003 Mares .................. G05D 1/0077 361/93.7
2003/0216876 A1 * 11/2003 Premerlani ............... G06F 1/12 702/58

(Continued)

FOREIGN PATENT DOCUMENTS

EP 2 237 296 A2 10/2010
WO WO 02/15351 A1 2/2002
WO WO 2012/152829 A1 11/2012

OTHER PUBLICATIONS

European Search Report dated Nov. 13, 2014, by the European Patent Office as the International Searching Authority for International Application No. EP 14169881.1 - 1805. (9 Pages).

*Primary Examiner* — Ronald W Leja
(74) *Attorney, Agent, or Firm* — Barnes & Thornburg LLP

(57) ABSTRACT

A method is disclosed of performing point on wave switching in a multiphase electrical system having a first circuit breaker connected a first bus, the first circuit breaker being operated by a first controller, a second circuit breaker connected to a second bus, the second circuit breaker being operated by a second controller, and a subsystem transferred from the first bus to the second bus. The method can include receiving, by the second controller, system characteristics data of the subsystem, estimating, by the second controller, a time for switching based on the received system characteristics data of the subsystem and operating time of the second circuit breaker, and operating, by the second controller, the second circuit breaker at the estimated time for switching, for switching the subsystem.

9 Claims, 3 Drawing Sheets

(56) References Cited

U.S. PATENT DOCUMENTS

| | | | | |
|---|---|---|---|---|
| 2008/0211317 | A1* | 9/2008 | Pilz | H01H 9/56 307/130 |
| 2010/0254060 | A1 | 10/2010 | Saito et al. | |
| 2012/0239373 | A1* | 9/2012 | Parapurath | H04L 43/50 703/18 |
| 2013/0271879 | A1* | 10/2013 | Andersen | B63J 3/00 361/20 |
| 2014/0100702 | A1* | 4/2014 | Schweitzer, III | G05B 13/02 700/286 |
| 2015/0179365 | A1* | 6/2015 | Parapurath | H01H 9/56 361/139 |

* cited by examiner

METHOD FOR POINT ON WAVE SWITCHING AND A CONTROLLER THEREFOR

RELATED APPLICATION

This application claims priority under 35 U.S.C. § 119 to Indian Patent Application No. 6040/CHE/2013 filed in India on Dec. 23, 2013, the entire content of which is hereby incorporated by reference in its entirety.

FIELD

The present disclosure relates to point on wave controllers. For example, the present disclosure relates to point on wave controllers employed on transfer bays.

BACKGROUND INFORMATION

In power systems, circuit breakers are used for connecting and disconnecting a load. During this process, active elements of the circuit breaker either interrupt or incept high current, causing stresses in the circuit breaker as well as connected power system components. The flow of the high current can be limited by closing and opening the circuit breaker at a specific instance on a source voltage waveform. A plurality of techniques are known for controlling the opening or closing of the circuit breaker in order to prevent generation of a transient phenomenon. Such techniques rely on usage of devices that perform synchronized switching control. One such device is a point on wave controller.

A point on wave controller is used for controlling a switching instance of the circuit breaker. On receiving a command from a bay control unit, the point on wave controller advances the command to achieve closing or opening at an instance to minimize the current, depending on the load connected, considering all the delay caused until the primary contact of the circuit breaker is closed or separated depending on whether it is a close or open operation. The point on wave controller detects the opening or closing actuation time (also referred to as operating time) of the circuit breaker and calculates a time for switching in respect of the opening or closure command signal of the circuit breaker to ensure switching on a particular point on the voltage waveform. Based on a calculated time, the point on wave controller controls the output timing of the opening or closure command signal. For calculating the synchronization delay time, the point on wave controller utilizes a plurality of inputs such as load characteristics, source voltage, source current, load voltage, ambient temperature, drive pressure of the circuit breaker, etc. By observing the source voltage, the point on wave controller predicts the future points on the source voltage waveform and will accordingly release the open or close command of the operating coils to the circuit breaker.

Currently, there is an increasing demand for using point on wave controllers for charging and discharging of static loads, such as reactors, capacitors, etc., and for energizing and de-energizing equipment such as transformers, lines, etc. so as to ensure proper switching operations. Due to this increasing demand, point on wave controllers are being used across all the bays of the power system including the transfer bay. However, currently the accuracy of the point on wave controller present on the transfer bay is lower than those of the point on wave controllers connected to the bays. Additionally, point on wave switching on the transfer bay can be procedurally complex. Therefore, when a load is transferred to the transfer bay, often improper switching operation occurs causing a reduction in life expectancy of the circuit breaker.

In light of the foregoing discussion, a method and system are disclosed that can address the issues mentioned.

SUMMARY

A method is disclosed of performing point on wave switching in a multiphase electrical system having a first circuit breaker connected to a first bus, the first circuit breaker being operated by a first controller, a second circuit breaker connected to a second bus, the second circuit breaker being operated by a second controller, and a subsystem transferred from the first bus to the second bus, the method comprising: a. receiving, by the second controller, system characteristics data of the subsystem from one or more system data sources; b. estimating, by the second controller, a time for switching based on the received system characteristics data of the subsystem and operating time of the second circuit breaker; and c. operating, by the second controller, the second circuit breaker at the estimated time for switching, for switching the subsystem, wherein the one or more system data sources includes at least one of the first controller and a central repository.

A controller is disclosed for operating a circuit breaker connected to a second bus for switching a subsystem which is transferred from a first bus to a second bus, the controller comprising: a. one or more processors configured to: receive system characteristics data of the subsystem, estimate a time for switching based on the received system characteristics data of the subsystem and operating time of a circuit breaker, and operate the circuit breaker at the estimated time for switching, for switching the subsystem; and b. a memory module functionally coupled to the one or more processors.

BRIEF DESCRIPTION OF THE DRAWINGS

Systems and methods of varying scope are described herein. In addition to aspects and advantages described in the foregoing summary, further aspects and advantages will become apparent by reference to the drawings and with reference to the detailed description that follows. In the drawings.

Figure 1:
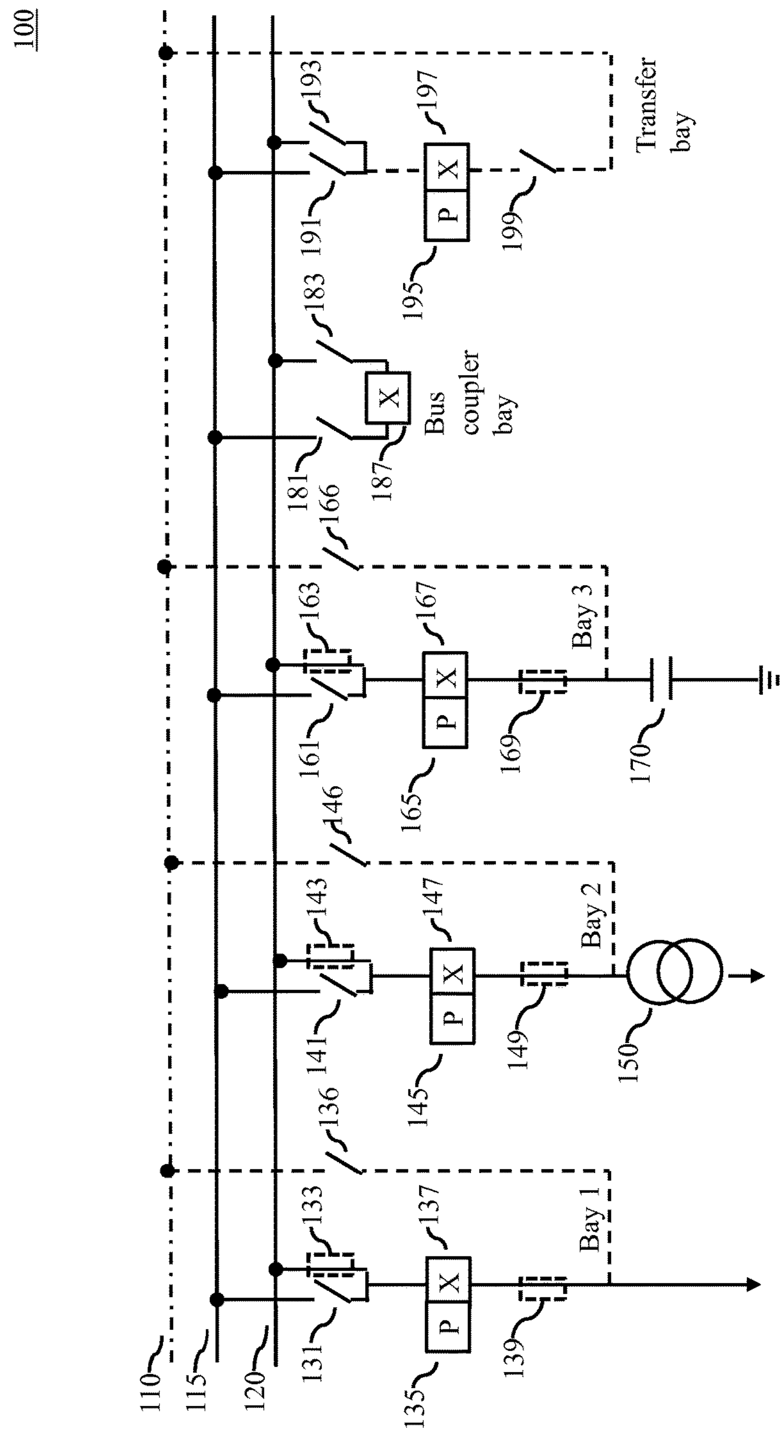
FIG. 1 illustrates a single line representation of a multiphase electrical system, in accordance with various exemplary embodiments of the present disclosure.

In the following detailed description, reference is made to the accompanying drawings that form a part hereof, and in which is shown by way of illustration specific exemplary embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description of the drawings is, therefore, not to be taken in a limiting sense.

DETAILED DESCRIPTION

The above-mentioned issues can be addressed by exemplary embodiments disclosed herein, as will be understood by reading the following specification.

In one aspect, the present disclosure provides a method of performing point on wave switching in a multiphase electrical system having a first circuit breaker connected to a first bus, the first circuit breaker operated by a first controller, a second circuit breaker connected to a second bus, the second circuit breaker operated by a second controller, and a subsystem transferred from the first bus to the second bus. An exemplary method can include receiving by the second controller, system characteristics data of the subsystem, estimating by the second controller, a time for switching based on the received system characteristics data of the subsystem and operating time of the second circuit breaker, and operating by the second controller the second circuit breaker at the estimated time for switching, for switching the subsystem.

In an exemplary embodiment, the method can further include subscribing by the second controller to a data stream of a measurement sensor associated with the subsystem upon receiving the system characteristics data. In an exemplary embodiment, the system characteristics data is transmitted from one or more subsystem data sources, upon receiving a signal from at least one of an isolator and an operator. In an exemplary embodiment, one or more subsystem data sources includes the first controller. In another embodiment, the one or more subsystem data sources can include a central data repository. The central data repository can be communicatively coupled to one or more controllers for receiving switching information from the one or more controllers.

In another aspect, the present disclosure provides a controller for operating a circuit breaker connected to a second bus for switching a subsystem. The subsystem can be transferred from a first bus to a second bus. The controller can have one or more processors configured to receive system characteristics data of the subsystem, estimate a time for switching based on the received system characteristics data of the subsystem and operating time of the circuit breaker, and operate the circuit breaker at the estimated time for switching, for switching the subsystem, and a memory module functionally coupled to the one or more processors.

In an exemplary embodiment, the one or more processors can be further configured to subscribe a data stream of a measurement sensor associated with the subsystem. In an exemplary embodiment, the controller can further include a network interface configured to communicate over an IEC 61850 channel for receiving the system characteristics data from one or more system data sources. In an exemplary embodiment, the one or more system data sources includes at least one of a first controller functionally coupled to a circuit breaker of the first bus and a central repository.

FIG. 1 illustrates an exemplary multiphase electrical system 100. The multiphase electrical system 100 includes a plurality of bays (shown in FIG. 1 as Bay 1, Bay 2 and Bay 3). Each bay includes an electrical subsystem which can be connected to any bus from a plurality of electrical buses (shown in FIG. 1 as bus 110, bus 115 and bus 120). Bus 115 and Bus 120 are main buses and bus 110 is a transfer bus used for maintenance purposes.

Bay 1 includes a transmission line as a subsystem connected in the bay section. A circuit breaker 137 is provided in bay 1 for protection and switching purposes. The circuit breaker 137 is connected to the bus 115 via isolator 131. The circuit breaker 137 can be connected to the bus 120 via isolator 133. The transmission line is connected to the circuit breaker 137 via an isolator 139. The transmission line can be connected to the transfer bus 110 directly using the isolator 136. Opening and closing of the circuit breaker 137 is operated by a point on wave controller 135 (also referred to as an intelligent electronic device 135).

Similarly, bay 2 includes a power transformer 150 as subsystem connected in the bay section. A circuit breaker 147 is provided in bay 2 for protection and switching purposes. The circuit breaker 147 is connected to the bus 115 via isolator 141. The circuit breaker 147 can be connected to the bus 120 via isolator 143. The power transformer 150 is connected to the circuit breaker 147 via an isolator 149. The power transformer 150 can be connected to the transfer bus 110 directly using the isolator 146. Opening and closing of the circuit breaker 147 is operated by a point on wave controller 145 (also referred to as an intelligent electronic device 145).

Similarly, bay 3 includes a capacitor bank 170 as subsystem connected in the bay section. The capacitor bank 170 is solid grounded. A circuit breaker 167 is provided in bay 3 for protection and switching purposes. The circuit breaker 167 is connected to the bus 115 via isolator 161. The circuit breaker 167 can be connected to the bus 120 via isolator 163. The capacitor bank 170 is connected to the circuit breaker 167 via an isolator 169. The capacitor bank 170 can be connected to the transfer bus 110 directly using the isolator 166. Opening and closing of the circuit breaker 167 is operated by a point on wave controller 165 (also referred to as an intelligent electronic device 165).

In addition to the above mentioned bays, the electrical system 100 can include a bus coupler bay used for connecting or coupling the main buses (bus 115 and bus 120) together. The bus coupler bay includes a circuit breaker 187 which can be connected to bus 115 using an isolator 181 and can be connected to bus 120 using an isolator 183. Connection between both the main buses (bus 115 and bus 120) can be achieved by closing the isolators 181 and 183, and by closing the circuit breaker 187.

Similarly, the electrical system 100 can include a transfer bay used for transferring a subsystem from a main bus (bus 115 or bus 120) to the transfer bus 110.

The transfer bay can include a circuit breaker 197 for protection and switching purposes. The circuit breaker 197 can be connected to the transfer bus via isolator 199. Similarly, the circuit breaker 197 can be connected to either of the main bus 115 via isolator 191 or main bus 120 via isolator 193. Opening and closing of the circuit breaker 197 is operated by a point on wave controller 195 (also referred to as an intelligent electronic device 195).

The point on wave controllers 135, 145,165 and 195 can be used to determine appropriate switching instances for operating the corresponding circuit breakers to ensure minimal electrical disturbance in the electrical system 100, and to ensure that electrical and mechanical shock generated while switching are minimal. The point on wave controllers 135, 145, 165 and 195 can be communicatively coupled to each other using a common communication channel or a dedicated bus. In an exemplary embodiment, the point on wave controllers (135, 145, 165 and 195) are configured to receive information relating to the state or position of isolators on a common communication bus based on a substation communication standard such as IEC 61850 GOOSE or on a dedicated communication bus.

In an exemplary embodiment, the point on wave controller (135, 145, 165 or 195) includes one or more processors for computation and estimation of a time for switching, a memory module functionally coupled to the one or more processors for storing information required to perform estimation of the time for switching, and a network interface capable of communicating over an IEC 61850 communication channel. The network interface of the point on wave controller (135, 145, 165 or 195) can be configured to receive information (referred to as system characteristics data) about the electrical subsystem (transmission line, power transformer 150 or capacitor bank 170) to which the corresponding circuit breaker is connected. The one or more processors of the point on wave controller (135, 145, 165 or 195) are configured to estimate the time for switching using the received information. These aspects are further explained in reference to FIG. 2.

It will be appreciated by those skilled in the art that while FIG. 1 shows three buses (main buses: bus 115 and bus 120, and transfer bus: bus 110), there can be a plurality of buses (both main and transfer) in the multiphase electrical system 100. Additionally, those skilled in the art will appreciate that while FIG. 1 is described with a separate transfer bus 110, any of the main buses can act as a transfer bus, thereby doing away with the need for a separate transfer bus. Similarly, it will be appreciated by those skilled in the art that while FIG. 1 shows three bays (bay 1, bay 2 and bay 3) with three subsystems (transmission line, power transformer 150 and capacitor bank 170), there can be a plurality of bays with a plurality of subsystems such as shunt reactors, motor loads, generator sets, etc., which are capable of drawing power or feeding power to the buses. The plurality of subsystems can be grounding using a plurality of grounding configurations such as solid grounding, ungrounded, dynamic grounding (referred herein dynamic grounding refers to a grounding configuration where the grounding of the subsystem is subject to change based on the requirements of the multiphase electrical system 100), etc. Additionally, it will be appreciated by those skilled in the art that while communication in respect of the point on wave controllers 135, 145, 165 and 195 is disclosed using IEC 61850 communication channel or a dedicated bus, there can a plurality of similar networks and corresponding network configurations known to the person skilled in art which can be used for communication among the point on wave controllers 135, 145, 165 and 195. Similarly, it will be appreciated by those skilled in the art that while FIG. 1 discloses circuit breakers (137, 147, 167, 187 and 197), similar switching devices can also be used in place of the circuit breakers.

Figure 2:
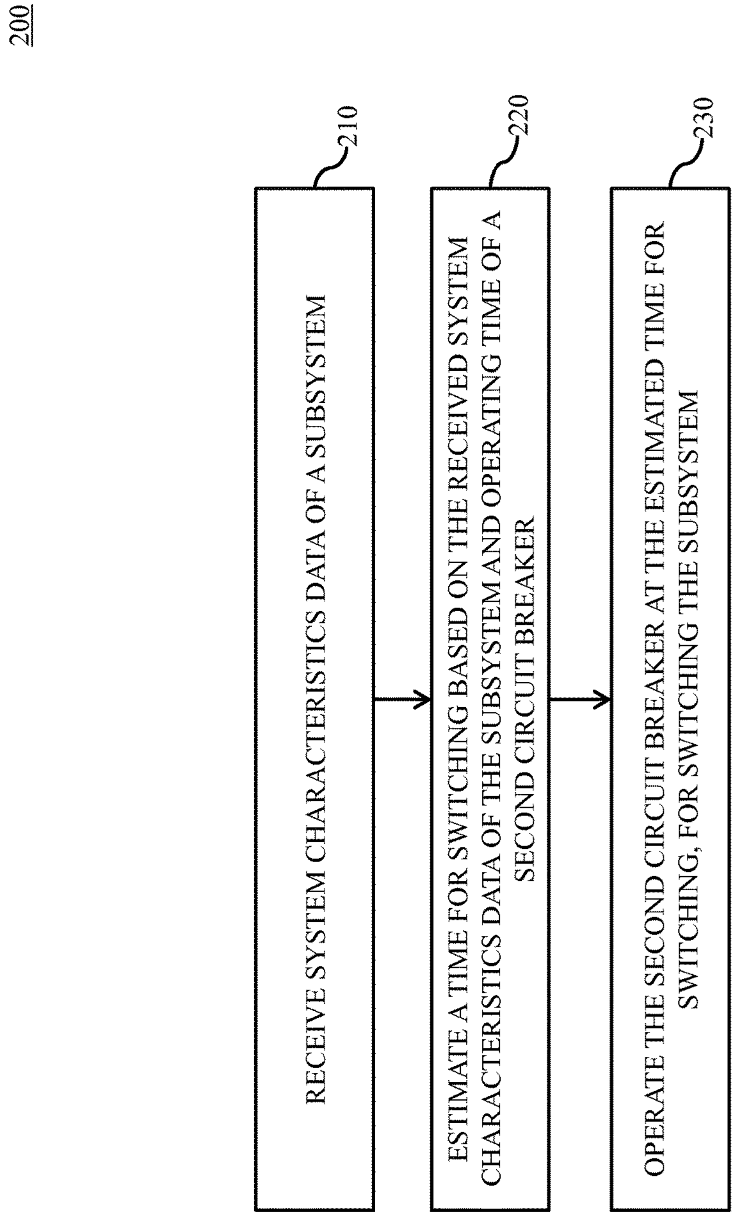
FIG. 2 is a flowchart of a method for performing point on wave switching in the multiphase electrical system using a second controller, in accordance with various exemplary embodiments of the present disclosure.

FIG. 2 is a flowchart 200 of an exemplary method of performing point on wave switching in the multiphase electrical system 100. For the sake of clarity, the method is explained using two examples: a first example in relation to the capacitor bank 170 and a second example in relation to the power transformer 150.

In the first example, the circuit breaker 167 is scheduled for repair. Therefore, the capacitor bank 170 is disconnected from the circuit breaker 167 vis-a vis bus 120 and is transferred to bus 110. The transfer of capacitor bank 170 from bus 120 to bus 110 is achieved in the following manner. The bus 120 is coupled with bus 110 by closing the isolators 199 and 193 of the transfer bay along with the circuit breaker 197 of the transfer bay, and the isolator 166 of the bay 3. Due to coupling parallel voltages are created in both the buses (bus 120 and bus 110). Subsequently, the circuit breaker 167 is opened, and then the isolators 163 and 169 are opened, thereby disconnecting the capacitor bank 170 from the bus 120, thereby effectively transferring the capacitor bank 170 from bus 120 to bus 110. It will be appreciated by those skilled in the art that while the abovementioned example describes an exemplary online transfer, the transfer can be achieved using any other philosophy.

On receiving a signal indicative of the transfer of the capacitor bank 170 from bus 120 to bus 110, the point on wave controller 165 transmits system characteristics data of the capacitor bank 170 to the point on wave controller 195. In an exemplary embodiment, the signal indicative of transfer refers to the information relating to the state or position of isolators 161, 169, 191 and 199. In another exemplary embodiment, signal indicative of transfer refers to a signal issued by an operator (using a workstation or an actuator) of the electrical system 100. In an exemplary embodiment, a SCADA (supervisory control and data acquisition) system can be utilized for initiation of transfer of the subsystem. An operator of the SCADA system informs the SCADA system that a transfer has to be performed. Subsequently, the SCADA system transmits a transfer-send command to the point on wave controller 135. On receiving a transfer command, the point on wave controller 135 transmits system characteristics data of the subsystem to the SCADA system. Upon successfully receiving the system characteristics data of subsystem, the SCADA system transmits a transfer-receive command to the point on wave controller 195 of the transfer bay. The point on wave controller 195 responds by sending a ready for transfer notification to the SCADA system. Upon receiving the ready for transfer notification from the point on wave controller 195, the SCADA system transmits the system characteristics data to the point on wave controller 195.

System characteristics data herein refers, for example, to information about all parameters relating to the subsystem (capacitor bank 170 in the first example) that are utilized in estimation of time for switching and in switching strategy. System characteristics data can include, but is not limited to, type of subsystem, grounding configuration of the subsystem, an order in which the phases of the subsystem were disconnected, lead operating phase associated with the subsystem, polarity sensitivity preference associated with the subsystem, a correction factor associated with subsystem, residual flux or trapped charges associated with the subsystem.

In the first example, the point on wave controller 165 transmits to the point on wave controller 195 the type of subsystem as a capacitor bank, the grounding configuration as solidly grounded, the order of phase disconnection as L1 phase, L2 phase, and L3 phase, lead operating phase as L1 phase, and polarity sensitivity preference of 1 (i.e., 1 indicative of the subsystem being polarity sensitive and 0 being indicative of the subsystem being polarity insensitive) associated with the capacitor bank 170. It will be appreciated by those skilled in the art that while the polarity sensitivity preference has been indicated as 0 or 1, various other combinations and values are possible.

At step 210, the point on wave controller 195 receives the system characteristics data of the capacitor bank 170 from the point on wave controller 165. Subsequently, the point on wave controller 195 is to perform switching of the capacitor bank 170.

At step 220, the point on wave controller 195 estimates the time for switching based on the received system characteristics data of the capacitor bank 170 and the operating time of the circuit breaker 197. In an exemplary embodiment, the point on wave controller 195 utilises additional information relating spring energy of an operating mechanism of the circuit breaker 197, drive pressure of the operating mechanism of the circuit breaker 197, ambient temperature around the circuit breaker 197 for estimating time for switching. Similarly, the point on wave controller determines the switching strategy to be used based on the system characteristics data of the capacitor bank 170. Since the type of subsystem is a capacitor bank, uncontrolled energization will lead to inrush currents and overvoltages. Therefore, the point on wave controller 195 determines appropriate switching instance as when the voltage in the bus 110 is zero (i.e., zero point crossing) and accordingly estimates the time for switching. The lead operating phase determines which phase has to be switched first. Since the lead operating phase of the capacitor bank 170 is L1 phase, the point on wave controller 197 estimates the time for switching where the first phase to be switched is L1. Similarly, the grounding configuration and the polarity sensitivity preference of the capacitor bank 170 determine the phase angles at which the switching can happen and therefore, in turn determine the time for switching. Since the grounding configuration of the capacitor bank 170 is solidly grounded and the polarity sensitivity preference is 1, the point on wave controller 195 estimates the time for switching where the phase angles are 0 degree for L1 phase, 120 degrees for L2 phase and 240 degrees for L3 phase. Based on the order of sequence L1, L2, and L3, the point on wave controller determines a switching strategy where the order of sequence is retained.

Upon estimating the time for switching at step 230, the point on wave controller 195 operates the circuit breaker 197 at the time for switching, for switching the subsystem (i.e., the capacitor bank 170). At the time for switching, the controller 195 issues the command for close or open to the circuit breaker 137. Due to the operating time of the circuit breaker 137, the closing or opening operation is complete at appropriate time instance at which zero point crossing occurs.

In the second example, a fault occurs in the circuit breaker 147 during the switching of the power transformer 150. Residual flux persists (corresponding to angle of $\alpha$ at phase L1, $\beta$ at phase L2, and $\ominus$ at phase L3) in the power transformer 150. Subsequently, using an offline transfer philosophy, the power transformer 150 can be transferred from the bus 120 to bus 110.

Upon receiving a signal indicative of transfer, the point on wave controller 145 transmits to the point on wave controller 195 the system characteristics data of the power transformer 150: the type of subsystem as a transformer, the grounding configuration as dynamic grounding, the order of phase disconnection as L1 phase, L2 phase, and L3 phase, lead operating phase as L1 phase, polarity sensitiveness preference of 0 associated with the power transformer 150, and a residual flux value (of greater than 0) associated with the power transformer 150 at a disconnected state.

At step 210, the point on wave controller 195 receives the system characteristics data of the power transformer 150 from the point on wave controller 145. Subsequently, the point on wave controller 195 is to perform switching of the power transformer 150.

At step 220, the point on wave controller 195 estimates the time for switching based on the received system characteristics data of the power transformer 150 and the operating time of the circuit breaker 197. Similarly, the point on wave controller determines the switching strategy to be used based on the system characteristics data of the power transformer 150.

Since the type of subsystem is a power transformer and the residual flux value is greater than zero, uncontrolled energization will lead to overfluxing of core of the power transformer 150 and heavy inrush currents capable of stressing windings of the power transformer 150. Therefore, the point on wave controller 195 determines the appropriate switching instance as when the voltage in the bus 110 is capable of inducing a prospective flux in the power transformer 150 for canceling out the residual flux, and accordingly estimates the time for switching. The lead operating phase determines which phase has to be switched first. Since the lead operating phase of the power transformer 150 is L1 phase, the point on wave controller 197 estimates the time for switching where the first phase to be switched is L1. Similarly, the grounding configuration and the polarity sensitivity preference of the power transformer 150 determine the phase angles at which the switching can happen and therefore, in turn determine the time for switching. Since the grounding configuration of the power transformer 150 is dynamic grounding which for example is solidly grounded, and the polarity sensitivity preference is 0, the point on wave controller 195 estimates the time for switching where the phase angles are $0+\alpha$ degree for L1 phase, $120+\beta$ degrees for L2 phase and $60+\ominus$ degrees for L3 phase. Based on the order of sequence L1, L2, and L3, the point on wave controller determines a switching strategy where the order of sequence is retained.

Upon estimating the time for switching at step 230, the point on wave controller 195 operates the circuit breaker 197 at the time for switching, for switching the subsystem (i.e., the power transformer 150). At the time for switching, the controller 195 issues the command for close or open to the circuit breaker 197. Due to the operating time of the circuit breaker 197, the closing or opening operation is complete at appropriate time instance at which residual flux is negated.

In an exemplary embodiment, the method can include subscribing, by the point on wave controller 195, to a data stream of a measurement sensor associated with the subsystem upon receiving the system characteristics data or upon receiving information indicative of transfer initiation. Measurement sensor herein refers for example, to any sensor or device which is capable of measuring one or more parameters of the subsystem. Measurement sensor includes, but is not limited to, voltage transformer, current transformer, and so forth. In an exemplary embodiment, the measurement sensor is a voltage transformer connected to the subsystem. In an exemplary embodiment, a merging unit is utilized to convert the analog readings of the measurement sensor to digital data stream. The point on wave controller utilizes the data stream of the measurement sensor in estimation of the time for switching.

In an exemplary embodiment, the system characteristics data of the subsystem can be transmitted to the point on wave controller 195 from a central repository. In an exemplary embodiment, the central repository resides on the SCADA system. The central repository is communicatively coupled using a communication network or bus with the point on wave controllers 135, 145, 165 and 195. The central repository receives system characteristics data of the subsystems corresponding to the controllers and stores the system characteristics data of the subsystems. In an exemplary embodiment, the central repository is configured to assist the point on wave controllers 135, 145, 165 and 195 in estimation of time for switching by providing a computation platform.

In an exemplary embodiment, the system characteristics data can include a correction factor associated with the subsystem. For example, a correction factor of 1 milliseconds is used relation to the capacitor bank 170. When the point on wave controller notices an error in time for switching, the point on wave controller utilizes the correction factor to correct the time for switching in the next estimation. The error correction process is iteratively performed.

It will be appreciated by those skilled in the art while the method is explained using the capacitor bank 170 and the power transformer 150, the method can be applied to a plurality of subsystems. Similarly, it will be appreciated by those skilled in the art, that switching herein refers to closing or opening of the subsystem connection using a circuit breaker. Additionally, the method can be used to transit system characteristics with corrections from the point on wave controller 195 to the other point on wave controllers upon from transfer of the subsystem back to the main bus.

Figure 3:
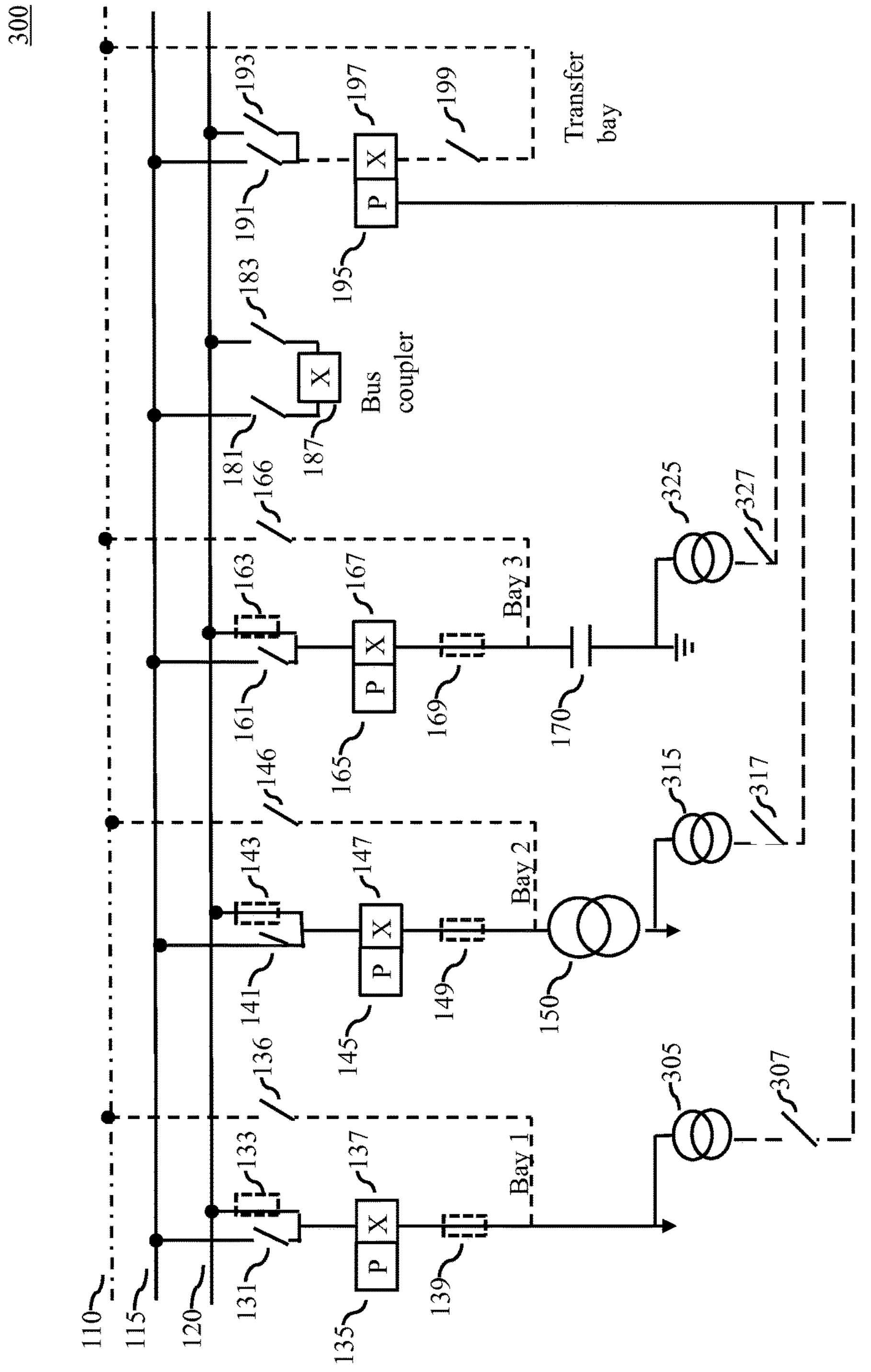
FIG. 3 illustrates a multiphase electrical system with one or more measurement sensors, in accordance with various exemplary embodiments of the present disclosure.

FIG. 3 illustrates an exemplary multiphase electrical system 300. The capabilities and components of the multiphase electrical system 300 are similar to the multiphase electrical system 100. Additionally, the multiphase electrical system 300 can include one or more voltage transformers 305, 315 and 325, connected to the transmission line, power transformer 150 and the capacitor bank 170 respectively. The voltage transformers 305, 315 and 325 can be connected to the point on wave controller 195 via isolators 307, 317 and 327 respectively. The voltage transformers are configured to publish voltage information about the subsystems over a common communication bus or a dedicated hard-wired line. The point on wave controller 195 utilizes the published voltage information about a subsystem to control the corresponding circuit breaker 197 and this information can be used to estimate the time for switching in addition to the system characteristics data.

This written description uses examples to describe the subject matter herein, including the best mode, and also to enable those skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of performing point on wave switching in a multiphase electrical system, the multiphase electrical system comprising a plurality of bays wherein each bay includes a subsystem capable of being connected to a bus from a plurality of electrical buses for transferring the subsystem from a first bus to a second bus, wherein the subsystem is connected to the first bus with a first circuit breaker, the first circuit breaker being operated by a first controller for transferring the subsystem to the second bus with a second circuit breaker operated by a second controller, and wherein the first controller and second controller are communicatively coupled to each other and to a central repository, the method comprising:

a. receiving, by the second controller, system characteristics data of the subsystem from one or more system data sources including at least one of the first controller or the central repository, wherein the system characteristics data includes information about parameters relating to the subsystem being transferred from the first bus to the second bus, wherein the system characteristics data is transmitted from the one or more system data sources upon receiving a signal from at least one of an isolator and an operator;

b. estimating, by the second controller, a time for switching based on the received system characteristics data of the subsystem being transferred from the first bus to the second bus and operating time of the second circuit breaker; and c. operating, by the second controller, the second circuit breaker at the estimated time for switching, for switching the subsystem being transferred from the first bus to the second bus.

2. The method as claimed in claim 1, comprising:

subscribing, by the second controller, to a data stream of a measurement sensor associated with the subsystem.

3. The method as claimed in claim 1, wherein the one or more system data sources includes the first controller.

4. The method as claimed in claim 1, wherein the one or more system data sources includes a central data repository, wherein the central data repository is communicatively coupled to one or more controllers for receiving switching information from the one or more controllers.

5. The method as claimed in claim 1, wherein the system characteristics data includes information regarding at least one of parameters relating to a type of the subsystem, grounding configuration of the subsystem, an order in which the phases of the subsystem were disconnected, lead operating phase associated with the subsystem, polarity sensitivity preference associated with the subsystem, a correction factor associated with the subsystem, residual flux associated with the subsystem, and trapped charges associated with the subsystem.

6. A controller for operating a circuit breaker connected to a second bus for switching a subsystem which is transferred from a first bus to the second bus, the controller comprising:

a. one or more processors configured to:

i) receive, from one or more system data sources, system characteristics data of the subsystem being transferred from the first bus to the second bus, wherein the system characteristics data is transmitted from the one or more system data sources upon receiving a signal from at least one of an isolator and an operator, and wherein the one or more system data sources include at least one of a central repository and another controller functionally coupled to a circuit breaker connected to the first bus, ii) estimate a time for switching based on the received system characteristics data of the subsystem being transferred from the first bus to the second bus and operating time of the circuit breaker connected to the second bus, and iii) operate the circuit breaker connected to the second bus at the estimated time for switching, for switching the subsystem being transferred from the first bus to the second bus; and b. a memory module functionally coupled to the one or more processors.

7. The controller as claimed in claim 6, wherein the one or more processors are configured to: subscribe a data stream of a measurement sensor associated with the subsystem.

8. The controller as claimed in claim 7, comprising:

a network interface configured to communicate over an IEC 61850 channel for receiving the system characteristics data from the one or more system data sources.

9. The controller as claimed in claim 6, wherein the controller comprises:

a network interface configured to communicate over an IEC 61850 channel for receiving the system characteristics data from the one or more system data sources.

* * * * *